US008854673B2

(12) United States Patent
Suzuki

(10) Patent No.: US 8,854,673 B2
(45) Date of Patent: Oct. 7, 2014

(54) IMAGE FORMING APPARATUS AND IMAGE FORMING METHOD FOR CONTROLLING SENDING OF AN ADVERTISING PACKET

(71) Applicant: Yuusuke Suzuki, Shizuoka-ken (JP)

(72) Inventor: Yuusuke Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/716,739

(22) Filed: Dec. 17, 2012

(65) Prior Publication Data

US 2013/0163043 A1   Jun. 27, 2013

Related U.S. Application Data

(60) Provisional application No. 61/580,396, filed on Dec. 27, 2011.

(51) Int. Cl.
*G06F 3/12* (2006.01)

(52) U.S. Cl.
CPC ............ *G06F 3/1296* (2013.01); *G06F 3/1232* (2013.01); *G06F 3/1204* (2013.01); *G06F 3/1288* (2013.01)
USPC ......... 358/1.15; 358/1.16; 358/1.17; 358/1.9; 358/1.6; 358/501; 358/401; 709/209; 709/211; 709/217; 709/227

(58) Field of Classification Search
CPC ................................. H04L 29/08144
See application file for complete search history.

(56) References Cited

U.S. PATENT DOCUMENTS

| 8,264,715 | B2* | 9/2012 | Nuggehalli | 358/1.15 |
| 8,553,252 | B2* | 10/2013 | Shimazaki | 358/1.15 |
| 2002/0051200 | A1* | 5/2002 | Chang et al. | 358/1.15 |
| 2002/0075836 | A1* | 6/2002 | Uematsu | 370/338 |
| 2004/0249956 | A1* | 12/2004 | Tanimoto | 709/227 |
| 2007/0058196 | A1* | 3/2007 | Nagahara et al. | 358/1.15 |
| 2009/0097062 | A1* | 4/2009 | Hayashi | 358/1.15 |
| 2011/0235120 | A1* | 9/2011 | Kinoshita et al. | 358/1.15 |

FOREIGN PATENT DOCUMENTS

| JP | 2008-140132 | 6/2008 |
| JP | 2010-128578 | 6/2010 |

* cited by examiner

*Primary Examiner* — Hilina K Demeter
(74) *Attorney, Agent, or Firm* — Amin, Turocy & Watson, LLP

(57) ABSTRACT

An image forming apparatus comprises an image forming unit configured to form an image on a recording medium, a communication interface configured to connect with a network and a control unit configured to stop sending an advertising packet indicating the existence thereof if an aggregate server for storing documents is detected based on the advertising packet received via the communication interface.

6 Claims, 6 Drawing Sheets

IMAGE FORMING APPARATUS AND IMAGE FORMING METHOD FOR CONTROLLING SENDING OF AN ADVERTISING PACKET

CROSS-REFERENCE TO RELATED APPLICATIONS

This application is based upon and claims the benefit of priority from U.S. Provisional Application No. 61/580,396 filed on Dec. 27, 2011; the entire contents of which are incorporated herein by reference.

FIELD

Embodiments described herein relate to an image forming apparatus and a control method for an image forming apparatus.

BACKGROUND

Conventionally, there is known a technique which connects an image forming apparatus such as a printer and a print server with a computer via a network.

Moreover, a tablet type portable terminal having a communication function is currently being popularized. With the use of the portable terminal, a file to be printed is stored in a print server, the user moves to a desired printer to specify the printer at the scene and send a printing indication.

When the printing indication is given, the list of an image forming apparatus is displayed on the screen of the portable terminal. The list is formed using an advertising packet or a broadcast packet sent by the image forming apparatus to a network However, there are a great many printers connected with a network in a large business location. Therefore, there are so many image forming apparatuses displayed on the portable terminal that the user sometimes does not know which one should be chosen.

DETAILED DESCRIPTION

Embodiments of an image forming apparatus and a control method for the image forming apparatus is described below in detail with reference to accompanying drawings.

In accordance with an embodiment, an image forming apparatus comprises an image forming unit configured to form an image on a recording medium, a communication interface configured to connect with a network and a control unit configured to stop sending an advertising packet indicating the existence thereof if an aggregate server for storing documents is detected based on the advertising packet received via the communication interface.

Figure 1:
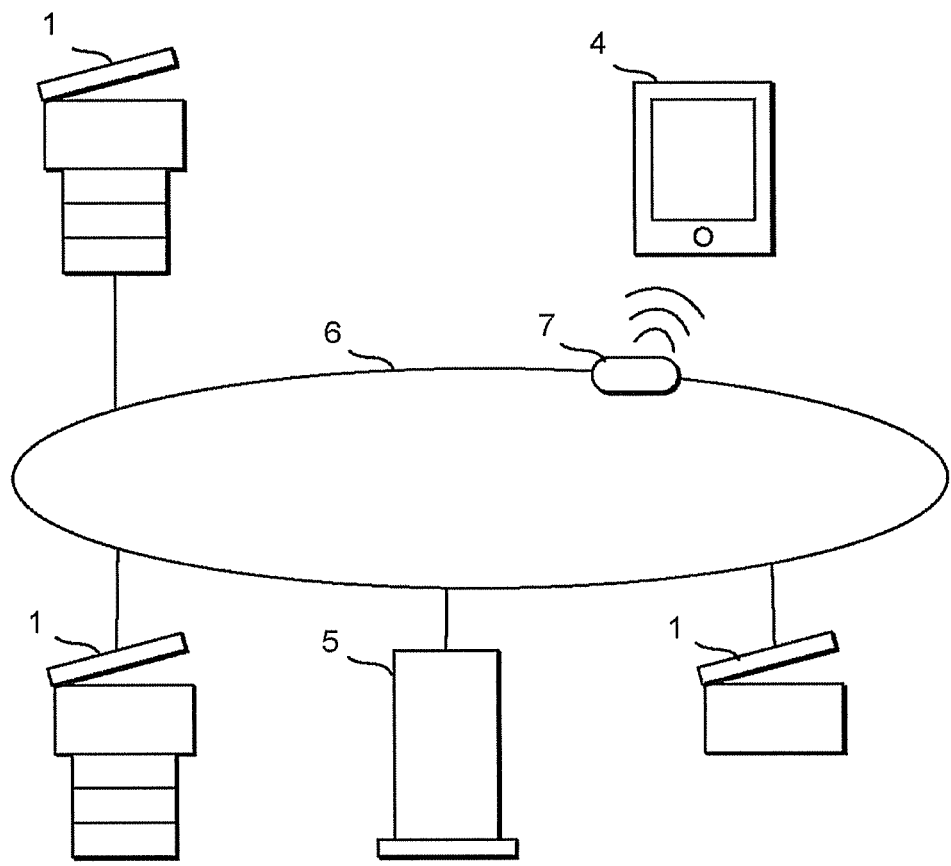
FIG. 1 is a diagram roughly showing a network connected with an image forming apparatus.

FIG. 1 is a diagram roughly showing a network connected with an image forming apparatus 1. As shown in FIG. 1, the image forming apparatus 1 provided in the embodiment is connected with a network 6 which is connected with an aggregate server 5 serving as a print server and a portable terminal 4 such as a tablet terminal.

The portable terminal 4 is connected with the network via a router 7 such as a wireless router.

The aggregate server 5, the so-called server computer, comprises: a CPU serving as an operating device, and ROM and an RAM serving as a memory, and a communication interface (hereinafter referred to as I/F) for achieving communication.

The aggregate server 5 broadcasts a packet containing the model name of the aggregate server over the network 6. The broadcasting refers to the synchronous sending of the same packet to unspecified addresses. The packet is hereafter referred to as an advertising packet.

As a result, each image forming apparatus 1 can detect the existence of the aggregate server 5 via the advertising packet.

After determining that an advertising packet is received from the aggregate server 5, the image forming apparatus 1 provided in the embodiment stops sending the advertising packet indicating the existence thereof.

Therefore, only the aggregate server 5 is displayed on the portable terminal 4 of the user.

Figure 2:
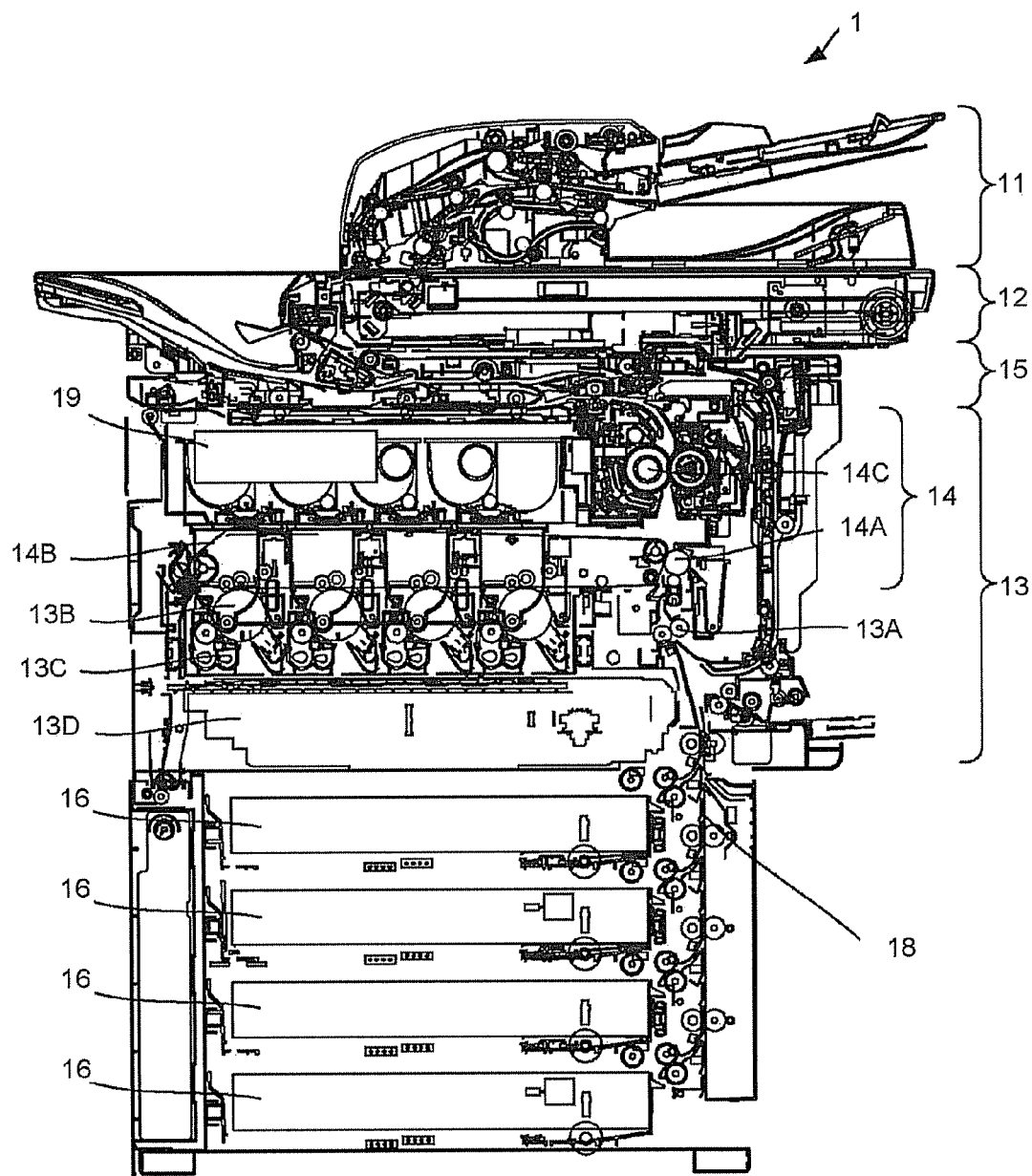
FIG. 2 is a diagram showing the structure of an image forming apparatus.

FIG. 2 is a diagram showing the structure of the image forming apparatus 1 provided in the embodiment. As shown in FIG. 2, the image forming apparatus 1 comprises an automatic original feeder 11, an image reading unit 12, an image forming unit 13, a paper feeding unit 16, a recording medium conveying mechanism 18 and a control unit 19.

The automatic original feeder 11 is arranged on the upper portion of the image forming apparatus 1 in such a manner that the automatic original feeder 11 can be opened or closed. The automatic original feeder 11 is provided with an original conveying mechanism for taking out originals, piece by piece, from a paper feeding tray and conveying the originals to a paper discharging tray.

With an original conveying function, the automatic original feeder 11 conveys originals, piece by piece, to the original reading unit of the image reading unit 12. Moreover, the automatic original feeder 11 may be opened to load originals onto the original table of the image reading unit 12.

The image reading unit 12 comprises: a carriage provided with an exposure lamp for exposing originals and a first reflection mirror; a plurality of second reflection mirrors acting in accordance with the actions of the carriage; a lens block; and the CCD (Charge Coupled Device) of an image reading sensor.

The carriage keeps motionless on an original reading unit or reciprocates under the original table so that the light of the exposure lamp reflected by the original transmits to the first reflection mirror. The plurality of second reflection mirrors enable the light reflected by the first reflection mirror to be reflected to the lens block. The lens bock changes the magnification of the reflected light and then outputs the reflected light to the CCD. The CCD changes incident light into an electric signal and outputs the electric signal to the image forming unit 13 as an image signal.

The image forming unit 13 is provided with a resist roller 13A for correcting the facing direction of the recording medium so that the side of the slantwise conveyed recording medium in the width direction is parallel to the conveying direction of the recording medium.

With the use of the image forming unit 13, the image forming apparatus 1 forms an image on the recording medium the facing direction of which is corrected using the resister roller 13A.

The image forming method of the image forming unit 13, which is not limited herein, can be chosen from, for example, an electronic image forming method and an inkjet type image forming method.

In the case of an electronic image forming method, the image forming unit 13 comprises, corresponding to Yellow Y, Magenta M, Cyan C and Black K, a laser radiation unit 13D, a photosensitive drum 13B serving as an electrostatic latent image carrier, a developer feeding unit 13C and a transfer unit 14.

The laser radiation unit 13D radiates laser beams towards the photosensitive drum 13B based on the image signal to form an electrostatic latent image on the photosensitive drum 13B. The developer feeding unit 13C feeds a developer to the photosensitive drum 13B to form a developer image using the electrostatic latent image.

The paper feeding unit 16 takes out, piece by piece, a recording medium from a paper feeding cassette and conveys the recording medium to the paper conveying mechanism. The paper conveying mechanism conveys the recording medium to the transfer unit 14.

The transfer unit 14 comprises a transfer belt 14B and a transfer roller 14A. The transfer belt 14B serving as an image carrier carries the developer of the photosensitive drum 13B to accept a transfer. The transfer roller 14A applies a voltage to transfer the developer of the transfer belt onto the recording medium conveyed thereto.

The image forming apparatus 1 is provided with a fixing device 14C at the downstream side of the recording medium conveying direction of the transfer unit 14. The fixing device 14C heats and applies a pressure to the developer to fix the developer on the recording medium.

The recording medium on which an image is formed is fed to a slip correction device 15.

In the case of an inkjet type image forming method, the image forming unit 13 is provided with a printing head for jetting ink to the recording medium.

The head comprises: an ink feeding chamber attached, in the length direction thereof, with piezoelectric elements with different polarities, wherein the groups of the attached piezoelectric elements are arranged in a comb shape; and an outer cover which is provided with an ink jetting hole and covers the ink feeding chamber. The image forming unit 13 applies a voltage to the printing head alternatively to transform the ink feeding chamber to suck ink and jet ink from the ink jetting hole repeatedly. The ejected ink is attached on the recording medium to form an image.

The image forming apparatus 1 has a validation method for validating a user. For instance, a host computer such as the aggregate server 5 has a validation table in which a user ID assigned to a user and a unique password assigned to the user ID are stored.

The image forming apparatus 1 has an input/output device such as a control panel. The image forming apparatus 1 sends the user ID and password input from the input/output device to the host computer.

The host computer reads the password from the validation table based on the user ID received. If the password read is the same as the password received, the host computer sends a validation packet indicating a successful validation to the image forming apparatus 1.

After receiving the validation packet, the image forming apparatus 1 sends printing data to the aggregate server. The image forming apparatus 1 forms an image according to the printing data received from the aggregate server 5.

Figure 3:
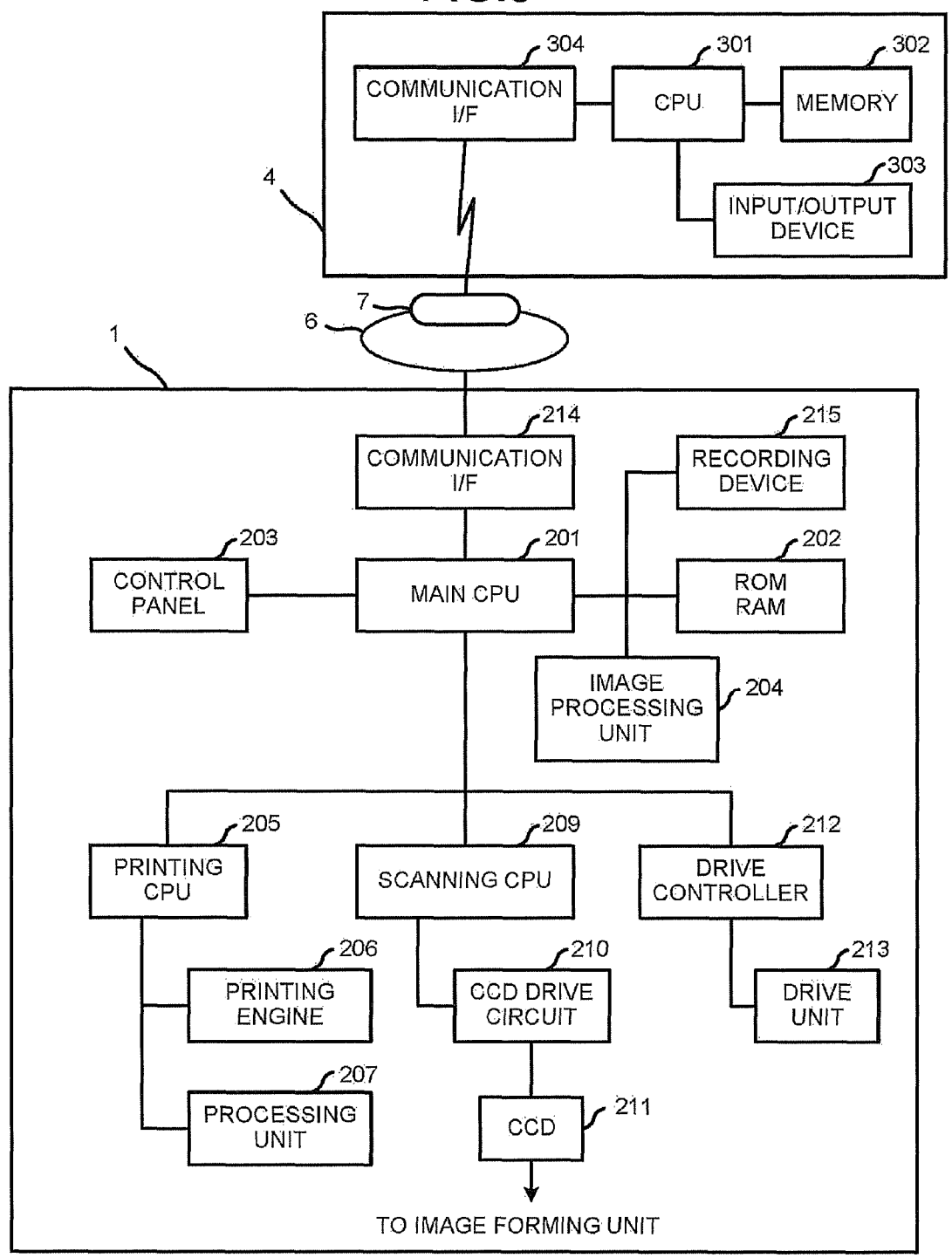
FIG. 3 is a block diagram showing structures of an image forming apparatus and a portable terminal.

FIG. 3 is a block diagram showing structures of the image forming apparatus 1 and the portable terminal 4. As shown in FIG. 3, the image forming apparatus 1 comprises: a main CPU 201 serving as a control unit 19 for comprehensively controlling the whole image forming apparatus 1; an ROM and an RAM 202 serving as a memory; a recording device 215 for storing information; an image processing unit 204 for processing an image; and a communication I/F 214 for conducting an information communication with a peripheral equipment.

The main CPU 201 is connected with a printing CPU 205 for controlling each unit of an image forming system, a scanning CPU 209 for controlling each unit of an image reading system and a drive controller 212 for controlling a drive unit.

In the case of an electronic image forming method, the printing CPU 205 controls: a printer engine 206 which forms an electrostatic latent image on a photosensitive drum 20B; and a process unit 207 for forming a developer image.

The scanning CPU 209 controls a CCD drive circuit 210 for driving a CCD 211. The signal from the CCD 211 is output to the image forming unit 13.

The drive controller 212 is connected with a drive unit 213.

The portable terminal 4 comprises: a CPU 301 serving as an operating device; a memory 302 such as an ROM and an RAM; an input/output device 303 such as a display, a keyboard and a mouse; and a communication I/F 304.

The portable terminal 4 is connected with the image forming apparatus 1 via a communication I/F 304 and a communication I/F 214.

Figure 4:
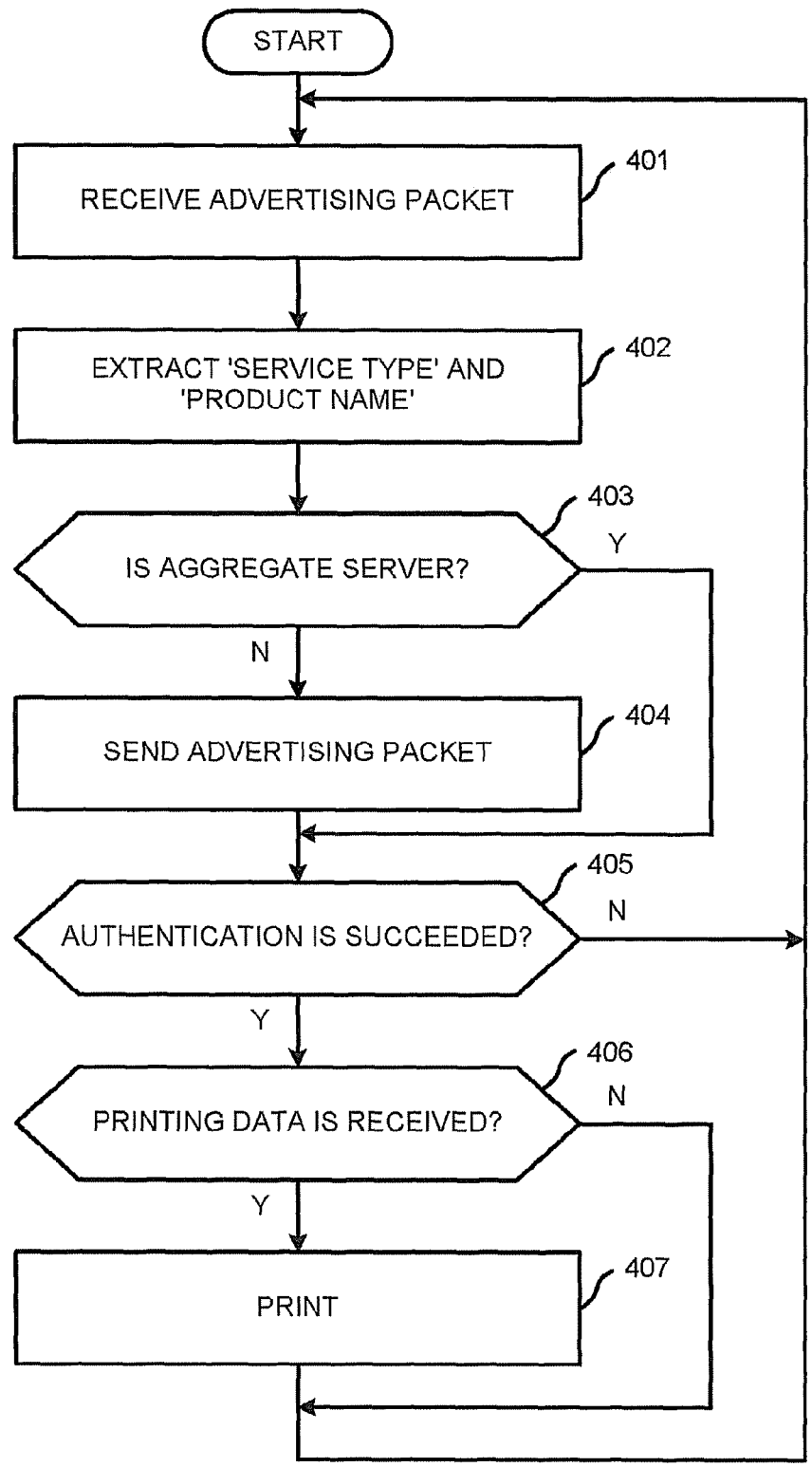
FIG. 4 is a flowchart illustrating the actions of an image forming apparatus.

FIG. 4 is a flowchart illustrating the actions of the image forming apparatus 1. As shown in FIG. 4, in Act 401, the image forming apparatus 1 receives an advertising packet.

In Act 402, the image forming apparatus 1 extracts 'Service Type' and 'Product Name' from the advertising packet.

In Act 403, the image forming apparatus 1 determines, based on 'Product Name' merely or 'Product Name' and 'Service Type', whether or not the advertising packet is from the aggregate server 5.

The image forming apparatus 1 may be configured to determine that the advertising packet is from the aggregate server 5 if the 'Product Name' of the advertising packet received is contained in a table which is set in the program executed by the image forming apparatus 1 to store 'Product Name' of a product conforming to the aggregate server 5.

After determining that the advertising packet is from the aggregate server 5, the image forming apparatus 1 stops sending an advertising packet indicating the existence thereof and proceeds to carry out Act 405, or after determining that the advertising packet is not from the aggregate server 5, the image forming apparatus 1 sends an advertising packet indicating the existence thereof in Act 404 and then proceeds to carry out Act 405.

In Act 405, the image forming apparatus 1 determines whether or not a user validation is succeeded. The image forming apparatus 1 proceeds to carry out Act 406 after determining the user validation is succeeded or returns to carry out Act 401 after determining the user validation is not succeeded.

In Act 406, the image forming apparatus 1 downloads, from the aggregate server 5, the list of the documents which are indicated by the user to be printed and displays the list on the control panel thereof. The user specifies a document to be printed from the list. The image forming apparatus 1 sends a download request to the aggregate server 5 to request the download of the printing data of the specified document.

Then, the image forming apparatus 1 determines whether or not the printing data is received. The image forming apparatus 1 proceeds to carry out Act 407 after determining the printing data is received or returns to carry out Act 401 after determining no printing data is received.

In Act 407, the image forming apparatus 1 carries out a printing action and then returns to carry out Act 401.

Figure 5:
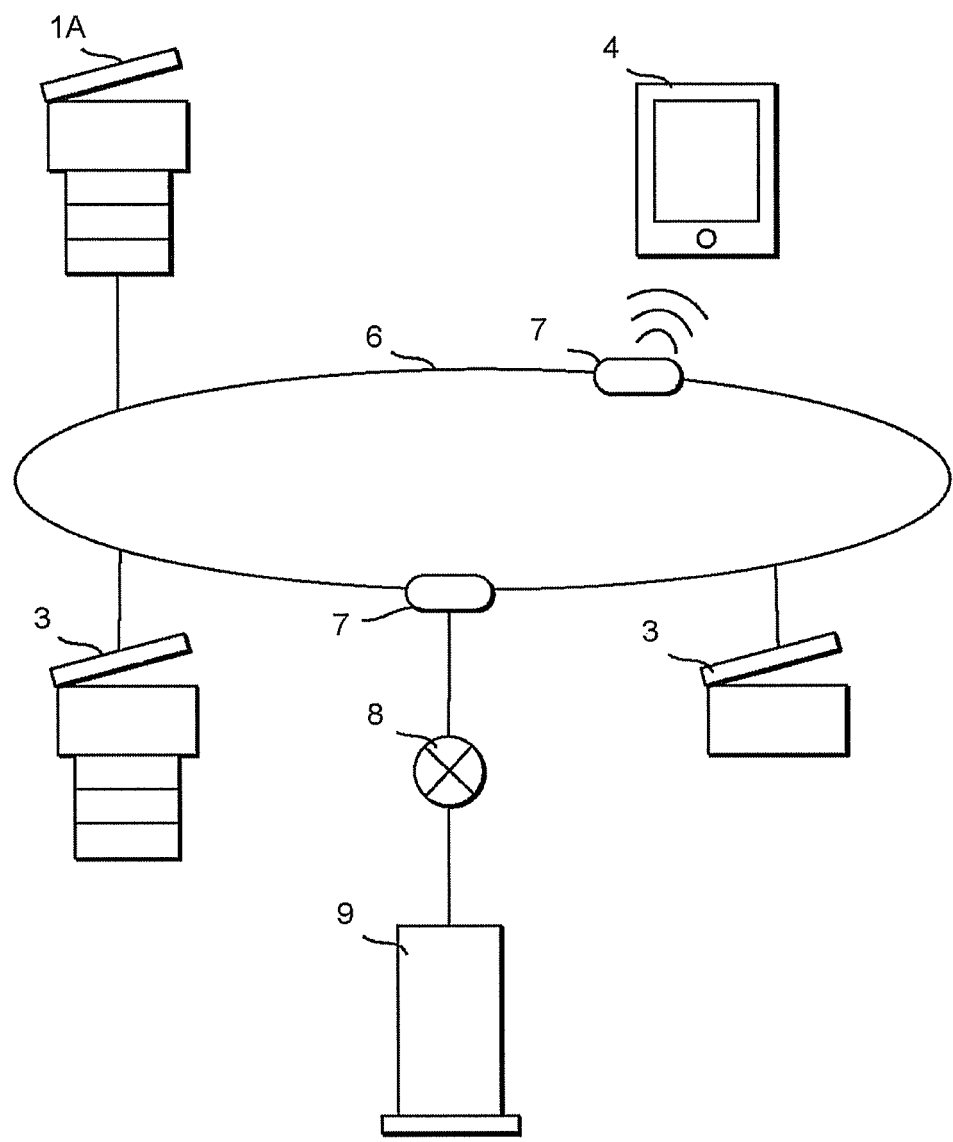
FIG. 5 is a diagram roughly showing a network connected with an image forming apparatus according to an exemplary embodiment.

FIG. 5 is a diagram roughly showing a network connected with the image forming apparatus 1 according to an embodiment. As shown in FIG. 5, a master device 1A selected as an image forming apparatus 1 is connected with a slave device 3 not selected as an image forming apparatus 1, an aggregate server 9 serving as a print server connected through a communication network such as the Internet and a network 6 connected with a portable terminal 4 such as a tablet terminal.

In this case, the advertising packet of the aggregate server 9 will not reach the image forming apparatus 1 connected with the network 6.

In the network structured like this, the master device 1A replaces the aggregate server 9 to broadcast a simulated advertising packet containing the 'Product Name' of the aggregate server to the network 6.

The slave device 3 stops sending an advertising packet indicating the existence thereof if the aggregate server 9 is detected through the simulated advertising packet.

Therefore, only the aggregate server 5 is displayed on the portable terminal 4 of the user.

Figure 6:
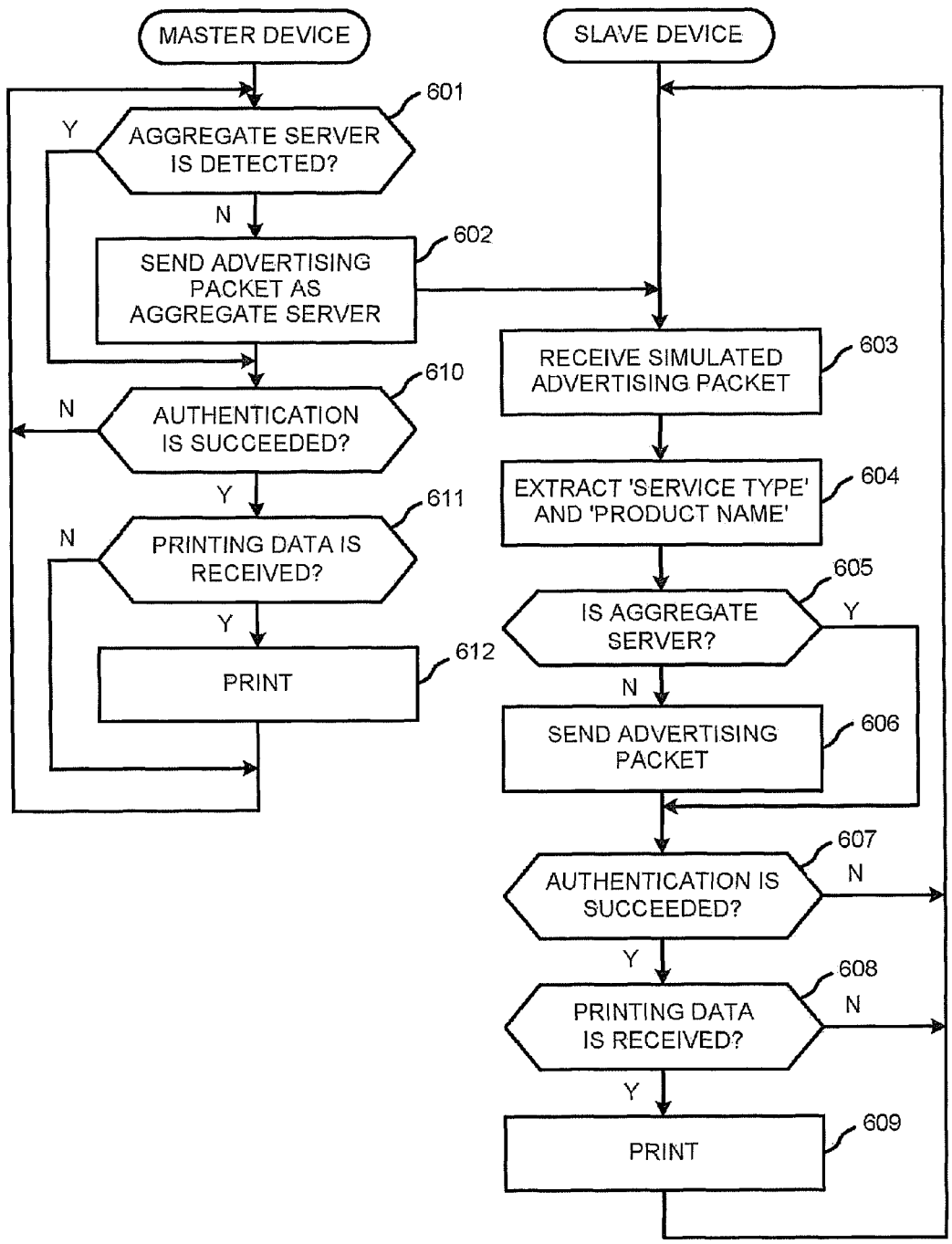
FIG. 6 is a flowchart illustrating the actions of a master device and a slave device.

FIG. 6 is a flowchart illustrating the actions of the master device 1A and the slave device 3. As shown in FIG. 6, in Act 601, the master device 1A determines whether or not the aggregate server 9 is detected.

The master device 1A receives the advertising packet and extracts 'Service Type' and Product Name' from the advertising packet.

The master device 1A determines, based on 'Product Name' merely or 'Product Name' and 'Service Type', whether or not the advertising packet is from the aggregate server 9.

The master device 1A may be configured to determine that the advertising packet is from the aggregate server 9 if the 'Product Name' of the advertising packet received is contained in a table which is set in the program executed by the master device 1A to store 'Product Name' of a product conforming to the aggregate server 9.

After determining that the advertising packet is from the aggregate server 9, the master device 1A stops sending an advertising packet indicating the existence of the image forming apparatus 1 and proceeds to carry out Act 610, or after determining that the advertising packet is not from the aggregate server 9, the master device 1A sends an simulated advertising packet indicating the existence of the aggregate server 9 in Act 602 and then proceeds to carry out Act 603.

In Act 603, the slave device 3 receives a simulated advertising packet.

In Act 604, the slave device 3 extracts 'Service Type' and 'Product Name' from the simulated advertising packet.

In Act 605, the slave device 3 determines, based on 'Product Name' merely or 'Product Name' and 'Service Type', whether or not the simulated advertising packet indicates the existence of the aggregate server 9.

The slave device 3 may be configured to determine that the simulated advertising packet indicates the existence of the aggregate server 9 if the 'Product Name' of the simulated advertising packet received is contained in a table which is set in the program executed by the slave device 3 to store 'Product Name' of a product conforming to the aggregate server 9.

After determining that the simulated advertising packet indicates the existence of the aggregate server 9, the slave device 3 stops sending the advertising packet indicating the existence thereof and proceeds to carry out Act 607, or after determining that the simulated advertising packet indicates no existence of the aggregate server 9, the slave device 3 sends an advertising packet indicating the existence thereof in Act 606 and then proceeds to carry out Act 607.

In Act 607, the slave device 3 determines whether or not a user validation is succeeded. The slave device 3 proceeds to carry out Act 608 after determining the user validation is succeeded or returns to carry out Act 603 after determining the user validation is not succeeded.

In Act 608, the slave device 3 downloads, from the aggregate server 9, the list of the documents which are indicated by the user to be printed and displays the list on the control panel thereof. The user specifies a document to be printed from the list. The slave device 3 sends a download request to the aggregate server 9 to request the download of the printing data of the specified document.

Then, the slave device 3 determines whether or not the printing data is received. The slave device 3 proceeds to carry out Act 609 after determining the printing data is received or returns to carry out Act 603 after determining no printing data is received.

In Act 609, the slave device 3 carries out a printing action and then returns to carry out Act 603.

In Act 610, the master device 1A determines whether or not a user validation is succeeded. The master device 1A proceeds to carry out Act 611 after determining the user validation is succeeded or returns to carry out Act 601 after determining the user validation is not succeeded.

In Act 611, the master device 1A downloads, from the aggregate server, the list of the documents which are indicated by the user to be printed and displays the list on the control panel thereof. The user specifies a document to be printed from the list. The master device 1A sends a download request to the aggregate server 9 to request the download of the printing data of the specified document.

Then, the master device 1A determines whether or not the printing data is received. The master device 1A proceeds to carry out Act 612 after determining the printing data is received or returns to carry out Act 601 after determining no printing data is not received.

In Act 612, the master device 1A carries out a printing action and then returns to carry out Act 601.

As stated above, the image forming apparatus 1 provided in this embodiment comprises: a recording medium conveying mechanism 18 configured to convey a recording medium; an image forming unit 13 configured to form an image on the recording medium; a communication I/F 214 connected with a network; and a control unit 19 configured to stop sending an advertising packet indicating the existence thereof based on an advertising packet received if an aggregate server 9 for storing documents is detected.

Therefore, the present invention has the following effect: the image forming apparatus 1 stopping sending an advertising packet is not displayed on the portable terminal 4, so it is easy to select an image forming apparatus 1 for carrying out a printing operation when a user gives a printing indication.

While certain embodiments have been described, these embodiments have been presented by way of example only, and are not intended to limit the scope of the invention. The novel embodiments described herein may also be embodied in a variety of other forms; furthermore, various omissions, substitutions and modifications can be devised without departing from the scope of the present invention. The accompanying claims and their equivalents are intended to cover such forms or modifications as would fall within the scope and spirit of the invention.

What is claimed is:

1. An image forming apparatus, comprising:
   an image forming unit configured to form an image on a recording medium;
   a communication interface configured to connect with a network; and
   a control unit configured to stop sending an advertising packet indicating the existence thereof if an aggregate server for storing documents is detected based on the advertising packet received via the communication interface, wherein
   the control unit sends an advertising packet indicating the existence thereof if the aggregate server is not detected based on the advertising packet received, and wherein
   the control unit sends a simulated advertising packet indicating the existence of the aggregate server if the aggregate server is not detected based on the advertising packet received in the case where the image forming apparatus is set as a master device.

2. The image forming apparatus according to claim 1, wherein
   the control unit stops sending an advertising packet indicating the existence thereof if the aggregate server for storing documents is detected based on the simulated advertising packet received in the case where the image forming apparatus is set as a slave device.

3. The image forming apparatus according to claim 2, wherein
   the control unit sends an advertising packet indicating the existence thereof if the aggregate server is not detected based on the advertising packet received in the case where the image forming apparatus is set as a slave device.

4. A control method for an image forming apparatus includes an image forming unit forms an image on a recording medium, comprising:
   receiving an advertising packet via the communication interface connected with a network;
   stopping sending the advertising packet indicating the existence thereof if an aggregate server for storing documents is detected based on the advertising packet;
   sending the advertising packet indicating the existence thereof if the aggregate server is not detected based on the advertising packet received; and
   sending a simulated advertising packet indicating the existence of the aggregate server if the aggregate server is not detected based on the advertising packet received in the case where the image forming apparatus is set as a master device.

5. The control method for the image forming apparatus according to claim 4, wherein
   stopping sending an advertising packet indicating the existence thereof if the aggregate server for storing documents is detected based on the simulated advertising packet received in the case where the image forming apparatus is set as a slave device.

6. The control method for the image forming apparatus according to claim 5, wherein
   sending an advertising packet indicating the existence thereof if the aggregate server is not detected based on the advertising packet received in the case where the image forming apparatus is set as a slave device.

* * * * *